United States Patent
Barrett et al.

(10) Patent No.: US 6,880,721 B1
(45) Date of Patent: Apr. 19, 2005

(54) PORTABLE CONTAINMENT BERM SYSTEM

(75) Inventors: Andrew N. Barrett, Spokane, WA (US); Craig Dolsby, Spokane, WA (US)

(73) Assignee: F.O. Berg Company, Spokane, WA (US)

( * ) Notice: Subject to any disclaimer, the term of this patent is extended or adjusted under 35 U.S.C. 154(b) by 0 days.

(21) Appl. No.: 10/430,600

(22) Filed: May 5, 2003

Related U.S. Application Data

(60) Provisional application No. 60/379,500, filed on May 8, 2002.

(51) Int. Cl.[7] .................................................. B65D 1/34
(52) U.S. Cl. ........................................ 220/573; 220/9.4
(58) Field of Search ................................. 405/115, 116; 588/900; 220/573, 9.1, 9.2, 9.3, 9.4, 608, 669

(56) References Cited

U.S. PATENT DOCUMENTS

| | | | | |
|---|---|---|---|---|
| 3,612,329 A | * | 10/1971 | Parks et al. ................. | 220/565 |
| 5,090,588 A | * | 2/1992 | Van Romer et al. ......... | 220/573 |
| 5,316,175 A | * | 5/1994 | Van Romer .................. | 220/573 |
| 5,429,437 A | * | 7/1995 | Shaw et al. ................... | 383/33 |
| 5,762,233 A | * | 6/1998 | Van Romer .................. | 220/573 |
| 5,797,994 A | * | 8/1998 | Rasmussen ................... | 134/10 |
| 5,924,461 A | * | 7/1999 | Shaw et al. ................... | 141/86 |
| 6,092,686 A | * | 7/2000 | Shaw et al. .................. | 220/573 |
| 2003/0029873 A1 | * | 2/2003 | Moffat et al. ................ | 220/573 |
| 2004/0169041 A1 | * | 9/2004 | Van Romer .................. | 220/573 |

* cited by examiner

*Primary Examiner*—Sunil Singh

(57) ABSTRACT

A portable containment berm system for efficiently and effectively containing hazardous material spills involving a vehicle. The portable containment berm system includes a liner having a floor, a pair of opposing sidewalls and a pair of opposing end portions. A pair of opposing foam collars are attached to the opposing end portions of the liner for creating a buoyancy within the end portions of the liner. A skirt is preferably attached to the outer portion of the liner with a plurality of first sleeves attached to side portions of the sidewall, a plurality of second sleeves attached to the skirt, and a plurality of support members removably attachable within the first sleeve and the second sleeve for supporting the sidewalls.

9 Claims, 7 Drawing Sheets

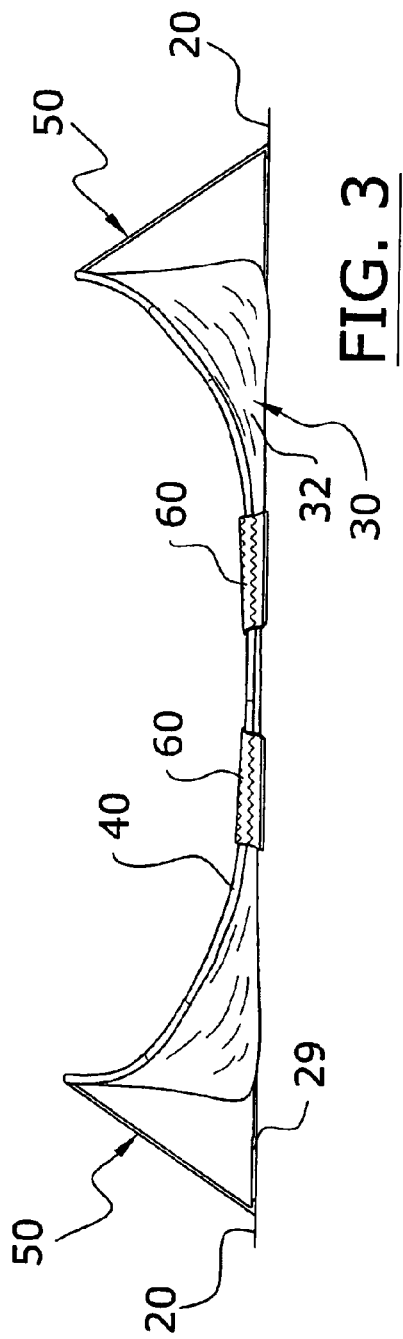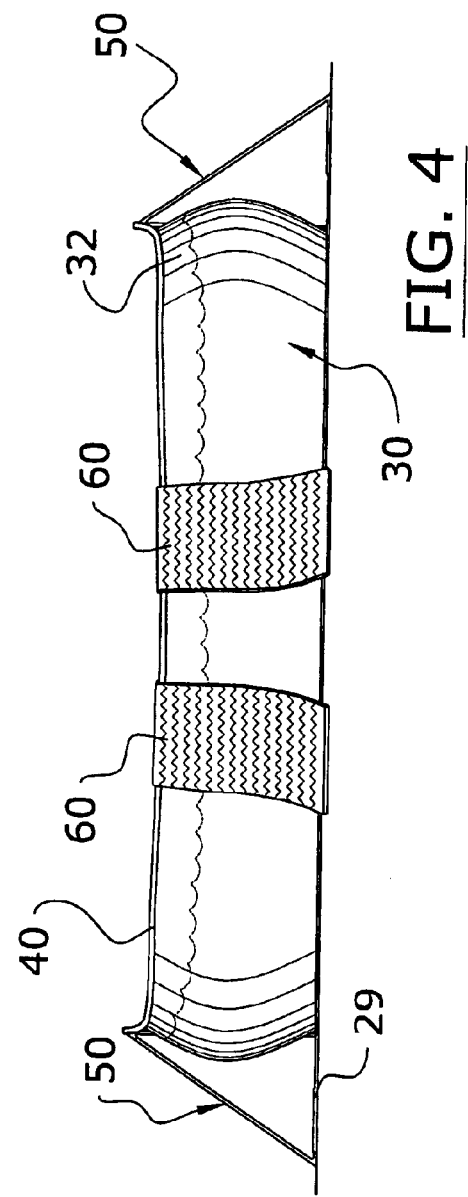

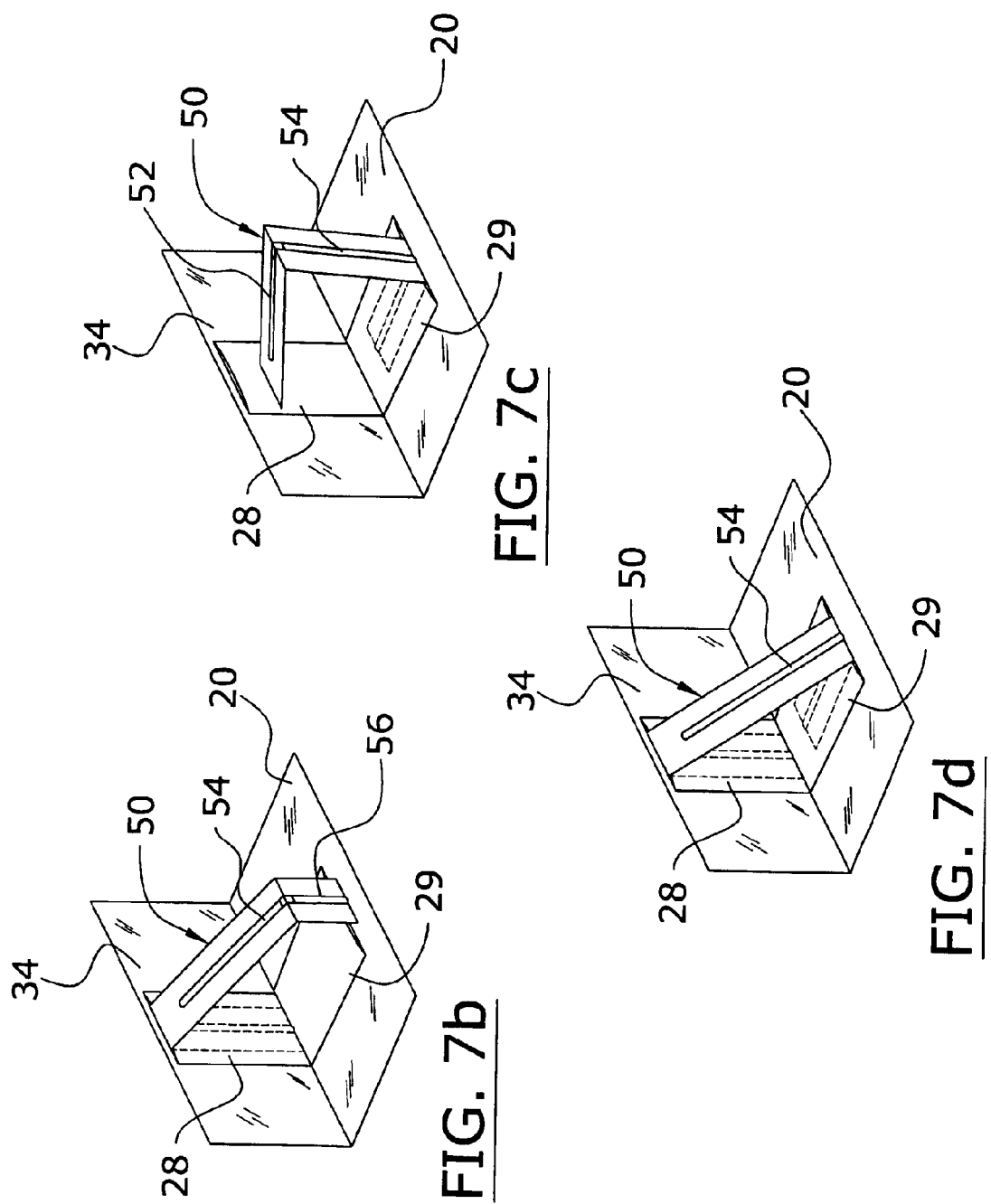

PORTABLE CONTAINMENT BERM SYSTEM

CROSS REFERENCE TO RELATED APPLICATIONS

I hereby claim benefit under Title 35, U.S. Code, Section 119(e) of U.S. provisional patent application Ser. No. 60/379,500 filed May 8, 2002. The 60/379,500 application is now abandoned. The 60/379,500 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to portable hazardous material containment devices and more specifically it relates to a portable containment berm system for efficiently and effectively containing hazardous material spills involving a vehicle.

2. Description of the Related Art

Conventional hazardous material containment berms are typically comprised of a solid concrete pit that the vehicle drives into for loading/unloading of hazardous materials such as chemicals, fuel and the like. Recently, portable hazardous material containment berms have been created that can be transported and setup in remote locations as desired. Conventional portable containment berms are comprised of a fabric attached to a supporting structure. These berms receive vehicles of various weights, sizes and lengths.

A main problem with conventional portable containment berms is that they require significant amounts of time and workers to assemble. A further problem with conventional portable containment berms is that they are relatively large in size and do not allow for a compact storage size. Another of the problems with conventional portable containment berms is that the corners of the fabric material are susceptible to tearing when driven over by the vehicle. Another problem with conventional portable containment berms is that if a support rod is broken, the entire containment berm must be returned to the manufacturer for repair since the support rods are not removable or replaceable.

While these devices may be suitable for the particular purpose to which they address, they are not as suitable for efficiently and effectively containing hazardous material spills involving a vehicle. Conventional portable containment berms are not suitable for extensive repeated usage, are prone to breakage and require significant assembly.

In these respects, the portable containment berm system according to the present invention substantially departs from the conventional concepts and designs of the prior art, and in so doing provides an apparatus primarily developed for the purpose of effectively containing hazardous material spills involving a vehicle.

BRIEF SUMMARY OF THE INVENTION

In view of the foregoing disadvantages inherent in the known types of hazardous material containment devices now present in the prior art, the present invention provides a new portable containment berm system construction wherein the same can be utilized for efficiently and effectively containing hazardous material spills involving a vehicle.

The general purpose of the present invention, which will be described subsequently in greater detail, is to provide a new portable containment berm system that has many of the advantages of the portable containment devices mentioned heretofore and many novel features that result in a new portable containment berm system which is not anticipated, rendered obvious, suggested, or even implied by any of the prior art portable containment devices, either alone or in any combination thereof.

To attain this, the present invention generally comprises a liner having a floor, a pair of opposing sidewalls and a pair of opposing end portions. A pair of opposing foam collars are attached to the opposing end portions of the liner for creating a buoyancy within the end portions of the liner. A skirt is preferably attached to the outer portion of the liner with a plurality of first sleeves attached to side portions of the sidewall, a plurality of second sleeves attached to the skirt, and a plurality of support members removably attachable within the first sleeve and the second sleeve for supporting the sidewalls.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a portable containment berm system that will overcome the shortcomings of the prior art devices.

A second object is to provide a portable containment berm system for efficiently and effectively containing hazardous material spills involving a vehicle.

An additional object is to provide a hazardous material containment berm system for effectively receiving and surrounding vehicles thereby containing hazardous materials in the event of accidental spillage.

A further object is to provide a hazardous material containment berm system that may be stored in a compact structure.

Another object is to provide a hazardous material containment berm system that does not have corners which are susceptible to tearing.

A further object is to provide a hazardous material containment berm system that is relatively inexpensive to manufacture compared to conventional containment berms.

An additional object is to provide a hazardous material containment berm system that is easy to drive onto and out of with a vehicle.

A further object is to provide a hazardous material containment berm that does not require significant amounts of assembly time.

Another object is to provide a hazardous material containment berm system that utilizes removable and replaceable side support members.

Another object is to provide a hazardous material containment berm system that can be easily transported, assembled, disassembled and stored.

A further object is to provide a hazardous material containment system that can be utilized with vehicles of various sizes, widths, lengths and weights.

Another object is to provide a hazardous material containment system that is capable of containing various amounts and types of hazardous materials.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 3 is an end view of the present invention in an empty state.

FIG. 4 is an end view of the present invention when partially filled with a liquid.

FIG. 7b is a perspective view of the support member positioned within the first sleeve.

FIG. 7c is a perspective view of the support member positioned within the second sleeve.

FIG. 7d is a perspective view of the support member positioned within the first sleeve and the second sleeve thereby supporting the sidewall of the liner.

DETAILED DESCRIPTION OF THE INVENTION

A. Overview

Figure 1:
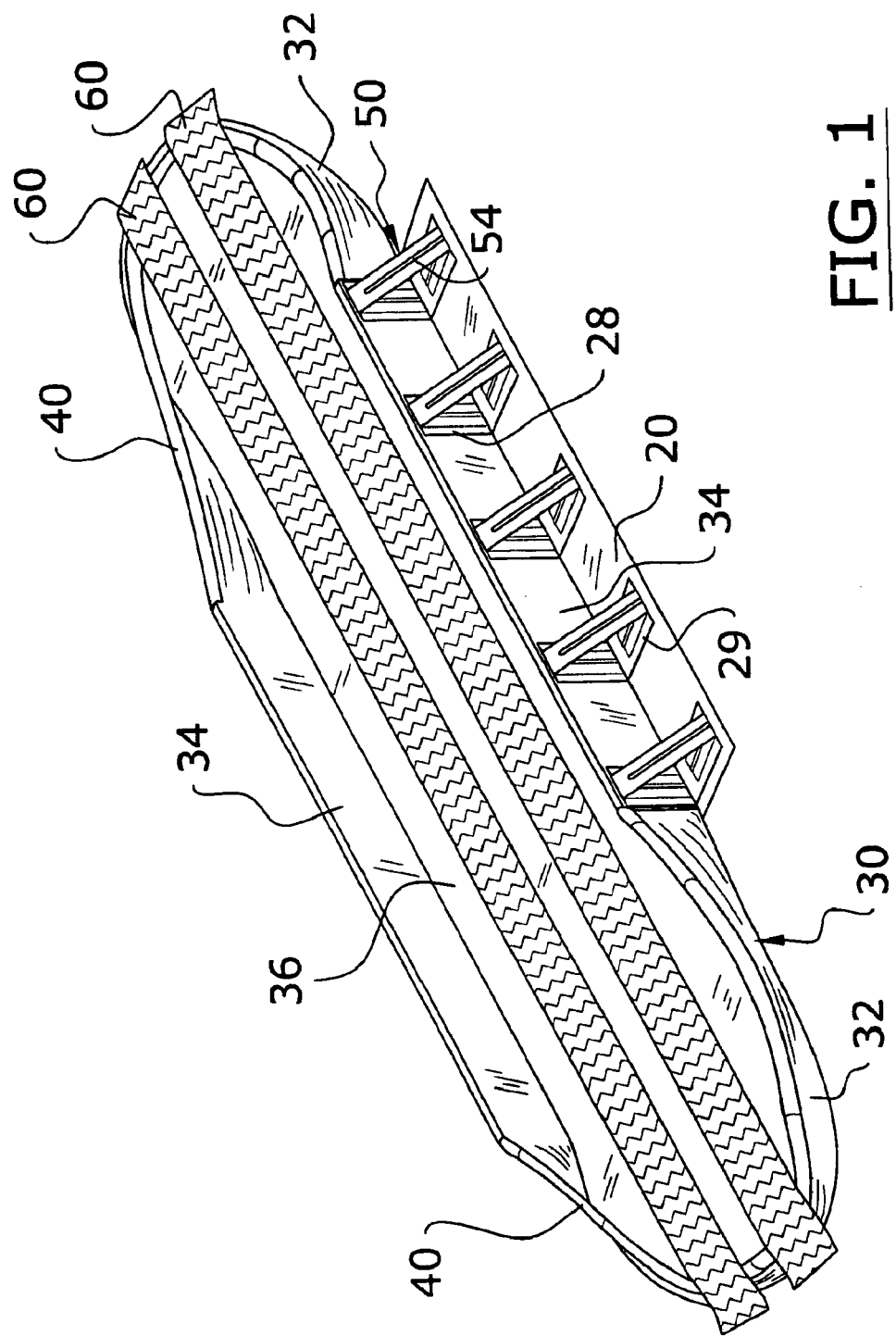
FIG. 1 is an upper perspective view of the present invention.

Turning now descriptively to the drawings, in which similar reference characters denote similar elements throughout the several views, FIGS. 1 through 8 illustrate a portable containment berm system, which comprises a liner 30 having a floor 36, sidewalls 34, and end portions 32. A pair of opposing foam collars 40 are preferably attached to the opposing end portions 32 of the liner 30 for creating a buoyancy within the end portions 32. A skirt may be attached to the outer portion of the liner 30 with a plurality of first sleeves 28 attached to exterior portions of the sidewalls 34, a plurality of second sleeves 29 attached to the skirt 20, and a plurality of support members 50 removably attachable within the first sleeve 28 and the second sleeve 29 for supporting the sidewalls 34.

B. Liner

Figure 2:
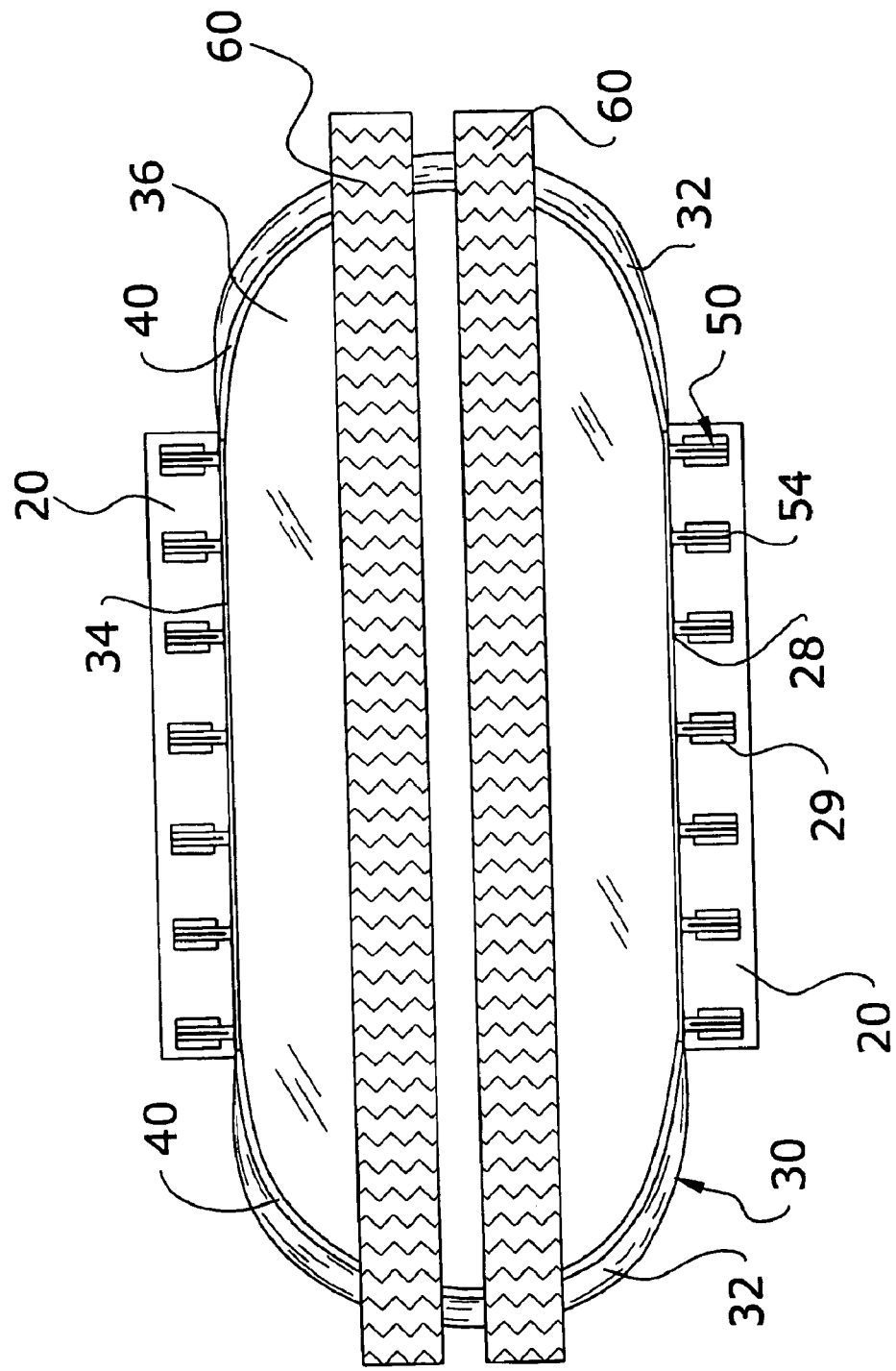
FIG. 2 is a top view of the present invention.
Figure 5:
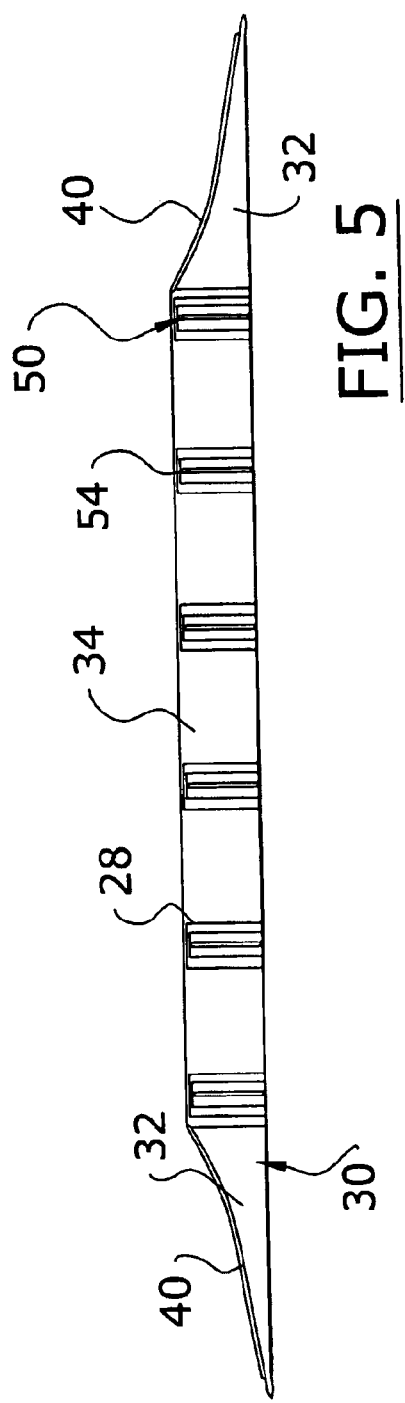
FIG. 5 is a side view of the present invention in an empty state.

The flexible liner 30 has a floor 36 and at least one sidewall 34 as best illustrated in FIGS. 1 and 2 of the drawings. The liner 30 may be comprised of various materials that are commonly utilized within the hazardous material containment industry that are non-permeably resistant to various chemicals and elements. The liner 30 preferably has an elongate shape with rounded end portions 32 as illustrated FIG. 2 of the drawings, however various other shapes may be utilized with the present invention. The liner 30 has a size sufficient for receiving various sizes of vehicles and retaining various volumes of hazardous materials.

Figure 6:
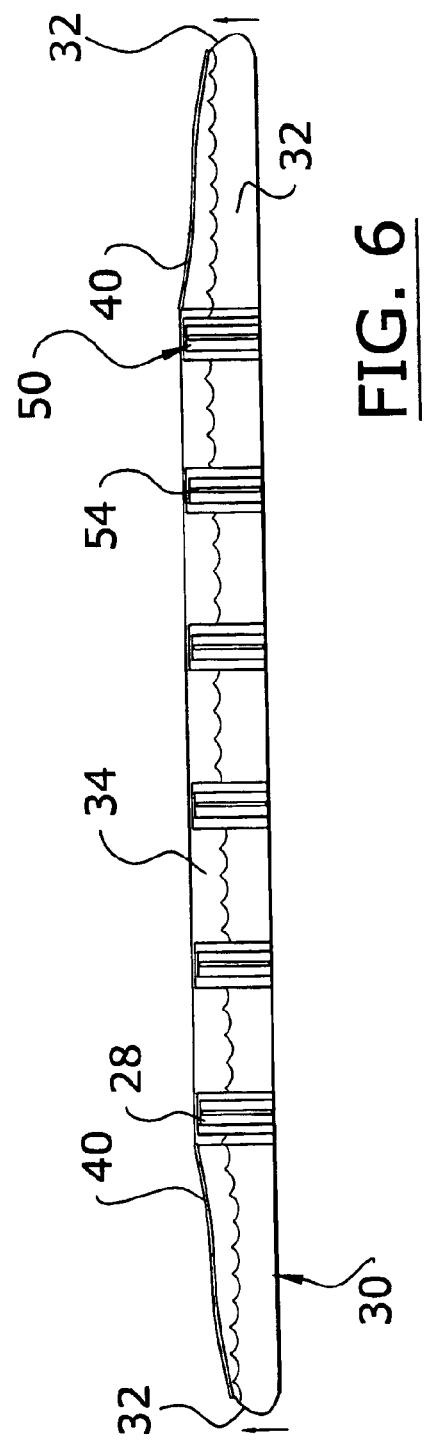
FIG. 6 is a side view of the present invention when partially filled with liquid.

As best illustrated in FIG. 6 of the drawings, the end portions 32 preferably have a curved vertical structure. The end portions 32 also preferably have a horizontally rounded structure to eliminate any corners from thereof that might tear or become damaged. The end portions 32 have a vertical curvature, wherein the vertical curvature extends inwardly as shown in FIG. 6 of the drawings.

As shown in FIGS. 1 through 4 of the drawings, a pair of elongate pad members 60 are positionable upon the end portions 32 and the floor 36 of the liner 30 that a vehicle drives upon. The pad members 60 protect the liner 30 from damage when the vehicle drives upon the present invention.

C. Side Support Structures

A pair of side support structures preferably support the sidewalls 34 of the liner 30 in a substantially vertical manner as shown in FIGS. 1 and 2 of the drawings. The side support structures may be comprised of various structures capable of supporting the sidewalls 34 in a substantially vertical manner such as but not limited to foam members, rigid walls and the like.

The plurality of first sleeves 28 are attached to outer side portions of the sidewall 34 as best illustrated in FIGS. 7b–7d of the drawings. The first sleeves 28 are preferably oriented in a vertical manner with an upper opening for receiving the first section of the support members 50. The lower end of the first sleeves 28 may be closed or open.

The plurality of second sleeves 29 attached to the skirt 20 correspondingly to the first sleeves 28 as best illustrated in FIGS. 7b–7d of the drawings. The second sleeves 29 are preferably oriented relatively parallel with the first sleeves 28 as best illustrated in FIGS. 7b–7d. The outer end of the second sleeves 29 has an opening for receiving the second section of the support members 50. The inner end of the second sleeves 29 may be closed or open.

The plurality of support members 50 are preferably removably attachable within the first sleeves 28 and the second sleeves 29 for supporting the sidewall 34 as shown in FIGS. 1, 2, 3 and 7b–7d of the drawings. The support members 50 each have a first section removably positionable within the first sleeves 28, a middle section, and a second section removably positionable within the second sleeves 29. The support members 50 may have a rigid or flexible structure. As shown in FIG. 7d of the drawings, the support members 50 have a triangular shape when positioned within the first sleeves 28 and the second sleeves 29. When the support members 50 have a flexible structure, the support member preferably have each section pivotally attached to each other.

Figure 7A:
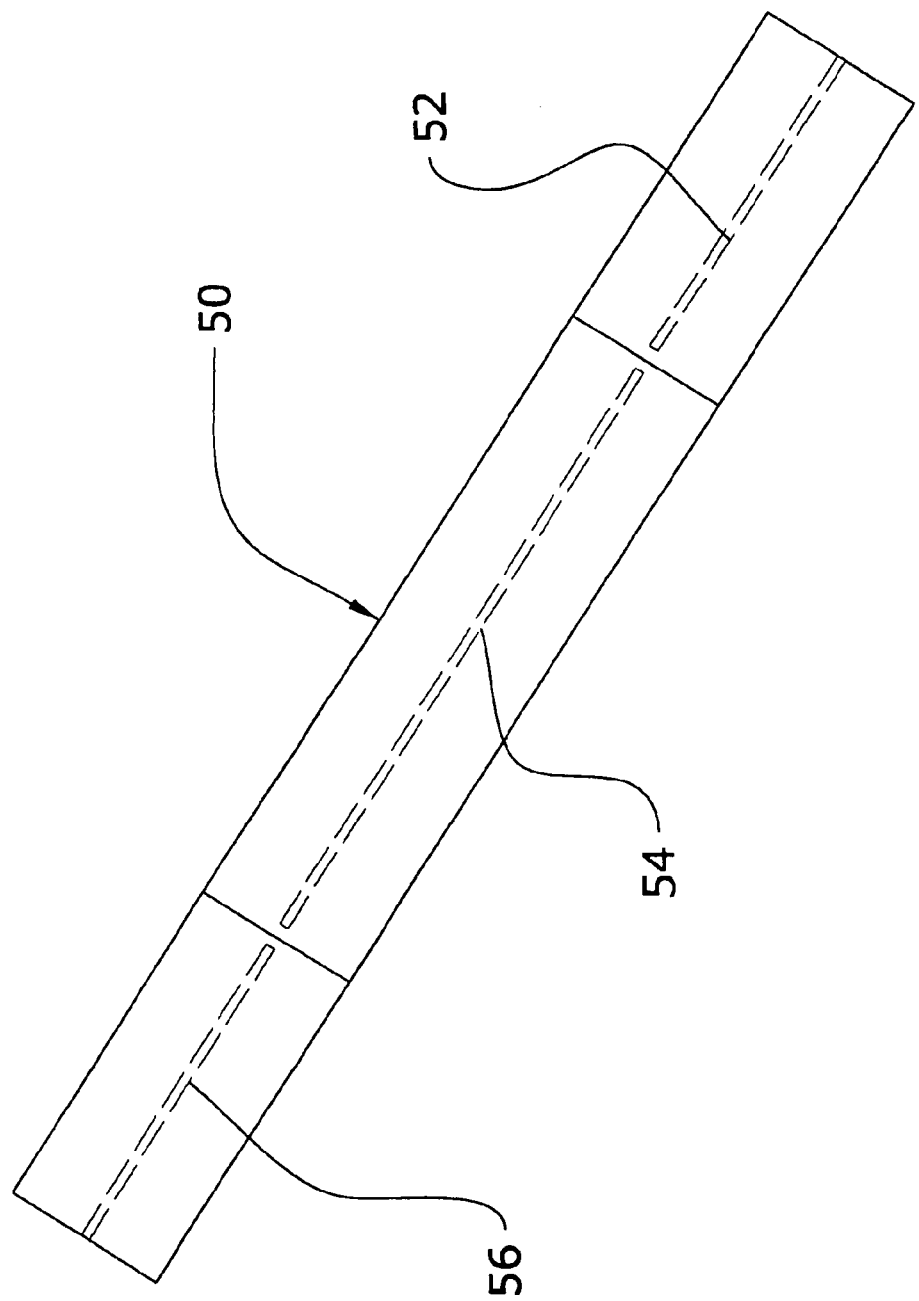
FIG. 7a is a top view of the support member.
Figure 8:
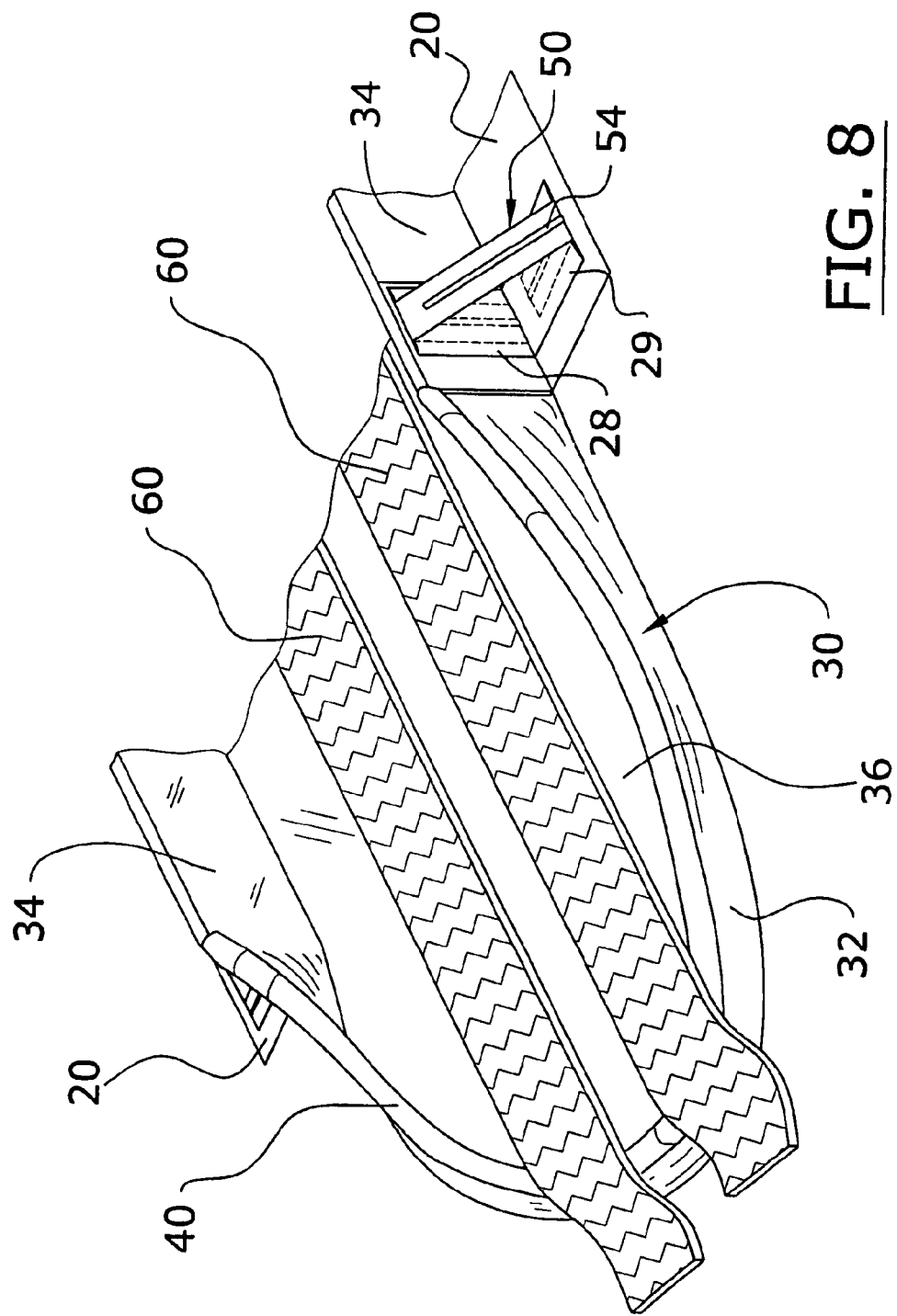
FIG. 8 is a magnified upper perspective view of the present invention.

The middle section of the support members 50 is preferably longer than the first section and the second section on opposing sides of the middle section as shown in FIG. 7a of the drawings. The middle section of the support members 50 is preferably longer than the first section and the second section as further shown in FIG. 7a of the drawings.

The middle section preferably includes an elongate rigid middle member 54 to add reinforcement to the middle section as shown in FIGS. 7a–7d of the drawings. The first section preferably includes a rigid first member 52 to add reinforcement to the first section as shown in FIGS. 7a and 7c of the drawings. The second section preferably includes a rigid second member 56 to add reinforcement to the second section as shown in FIGS. 7a and 7b of the drawings. The sections of the support members 50 may be formed by securing two opposing flexible flat members about the first member 52, second member 56 and the middle member 54. There is preferably a space between the first member 52, the middle member 54 and the second member 56 to facilitate pivoting of the sections of the support members 50 as best illustrated in FIG. 7a of the drawings. Various rigid materials may be utilized to construct the first member 52, second member 56 and the middle member 54. The support members 50 preferably have a relatively flat and broad structure as shown in the drawings, however various other shapes and structures may be utilized to construct the support members 50.

D. Skirt

The skirt 20 is attached to an outer lower portion of the liner 30 as shown in FIGS. 1 and 2 of the drawings. The skirt 20 preferably extends outwardly from the liner 30 substantially parallel to the floor 36 when positioned upon a ground surface as shown in FIG. 1 of the drawings. The skirt 20 is preferably comprised of the same material as the liner 30, however various other materials may be utilized.

The skirt 20 may mirror the outer shape of the liner 30 as illustrated in FIG. 2 of the drawings, however various other shapes may be utilized for the skirt 20. In addition, tie down straps may be attached to the skirt 20 for allowing securing of the skirt 20 and liner 30 to the ground surface.

E. Foam Collars

As shown in FIGS. 1 through 4 of the drawings, a pair of elongate foam collars 40 are attached to an upper portion of the end portions 32 of the flexible liner. The pair of foam collars 40 are comprised of a resilient buoyant foam material that is capable of lifting and elevating the upper portion of the end portions 32 when a liquid is entered into the interior of the liner 30. The foam material is also preferably capable of being driven upon by heavy vehicles without damage to the foam collars 40.

The foam collars 40 preferably have a diameter of between 2 inches to 6 inches, but the diameter may be larger or smaller. The foam collars 40 may be attached to the liner 30 or positioned within a pocket within the end portions 32 of the liner 30.

F. Operation of Invention

In use, the user positions the liner 30 in the desired location where the loading/unloading of hazardous materials is to take place. The user then inserts the support members 50 into the first sleeves 28 and the second sleeves 29. FIG. 7b illustrates the insertion of the first section of the support members 50 into the first sleeve 28 of the sidewalls 34. FIG. 7c illustrates the insertion of the second section of the support members 50 into the second sleeve 29 of the skirt 20. The support members 50 prevent the sidewalls 34 of the liner 30 from collapsing inwardly and thereby supports the sidewalls 34 in a substantially vertical manner. As stated previously, various other side support structures may be utilized to support the sidewalls 34.

The user thereafter is able to drive a vehicle onto the floor 36 of the liner 30. The user drives across one of the ends of the liner 30 preferably upon the pad members 60 as the liner 30 is substantially flat at the end portions 32. The user continues to drive the vehicle on the present invention until fully positioned within the liner 30. If a hazardous liquid is spilled into the liner 30, the hazardous liquid will first flood the floor 36 of the liner 30. The hazardous liquid will thereafter rise to a level adjacent to the sidewall 34 of the liner 30 and the foam collars 40 wherein the liner 30 retains the liquid internally. The user is thereafter able to cleanup the site by first recovering the hazardous liquid from within the liner 30 and thereafter cleaning the liner 30 for reuse at a later time. For storage, the above processes are simply reversed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A portable containment berm system, comprising:

a flexible liner having a floor and at least one sidewall, wherein said sidewall has a pair of opposing end portions and a pair of opposing side portions;

a pair of foam collars attached to an upper portion of said end portions of said flexible liner;

a skirt attached to an outer portion of said liner;

a plurality of first sleeves attached to said side portions of said sidewall, wherein said first sleeves each have an upper opening;

a plurality of second sleeves attached to said skirt, wherein said second sleeves each have an outer opening; and a plurality of support members removably attachable within said upper opening of said first sleeves and said outer opening of said second sleeves for supporting said sidewall, wherein said plurality of support members each are comprised of a first member attachable within said first sleeves, a second member attachable within said second sleeves and a middle member attached to said first member and said second member at an acute angle.

2. The portable containment berm system of claim 1, wherein said pair of foam collars are comprised of a buoyant foam material.

3. The portable containment berm system of claim 1, wherein said end portions have a horizontally rounded structure.

4. The portable containment berm system of claim 1, wherein said end portions have a vertical curvature.

5. The portable containment berm system of claim 4, wherein said vertical curvature extends inwardly.

6. The portable containment berm system of claim 1, wherein said end portions have a vertical curvature.

7. The portable containment berm system of claim 6, wherein said vertical curvature extends inwardly.

8. The portable containment berm system of claim 1, wherein said foam collars have a diameter between 2 inches to 6 inches.

9. The portable containment berm system of claim 1, including a pair of elongate pad members that are positionable upon the end portions of said liner that a vehicle drives upon.

* * * * *